(12) United States Patent
Steenwinkel et al.

(10) Patent No.: US 7,157,501 B2
(45) Date of Patent: Jan. 2, 2007

(54) FISCHER-TROPSCH PROCESS USING A FISCHER-TROPSCH CATALYST AND A ZEOLITE-CONTAINING CATALYST

(75) Inventors: Edgar Evert Steenwinkel, Haarlem (NL); Marieke Paulyne Renate Spee, Utrecht (NL); Johannes Petrus Jozef Verlaan, Deventer (NL); Eelco Titus Carel Vogt, Culemborg (NL)

(73) Assignee: Albemarle Netherlands B.V., Amersfoort (NL)

( * ) Notice: Subject to any disclaimer, the term of this patent is extended or adjusted under 35 U.S.C. 154(b) by 0 days.

(21) Appl. No.: 10/533,870

(22) PCT Filed: Oct. 30, 2003

(86) PCT No.: PCT/EP03/12166

§ 371 (c)(1),
(2), (4) Date: Oct. 24, 2005

(87) PCT Pub. No.: WO2004/041970

PCT Pub. Date: May 21, 2004

(65) Prior Publication Data

US 2006/0100293 A1    May 11, 2006

(30) Foreign Application Priority Data

Nov. 5, 2002    (EP) .................. 02079646

(51) Int. Cl.
  *C07C 27/00*    (2006.01)
  *C10G 65/00*    (2006.01)
  *C10G 15/00*    (2006.01)

(52) U.S. Cl. ............... 518/700; 518/715; 518/719; 208/58; 208/106

(58) Field of Classification Search ............... 518/700, 518/715, 719; 208/58, 106
  See application file for complete search history.

(56) References Cited

U.S. PATENT DOCUMENTS

| | | |
|---|---|---|
| 3,254,023 A | 5/1966 | Miale et al. |
| 4,269,783 A | 5/1981 | Brennan et al. |
| 4,556,645 A | 12/1985 | Coughlin et al. |
| 4,595,702 A | 6/1986 | Chu et al. |
| 4,652,538 A | 3/1987 | Rabo et al. |
| 4,665,042 A * | 5/1987 | Budge et al. ............ 502/61 |
| 4,906,671 A | 3/1990 | Haag et al. |
| 5,928,980 A | 7/1999 | Gangwal et al. |

* cited by examiner

*Primary Examiner*—J. Parsa
(74) *Attorney, Agent, or Firm*—Frank C. Eymard

(57) ABSTRACT

Fischer-Tropsch process for the conversion of carbon monoxide and hydrogen to $C_5^+$ hydrocarbon mixtures in which process use is made of Fischer-Tropsch catalyst particles and fluid catalytic cracking (FCC) catalyst particles. The FCC catalyst can be a fresh FCC catalyst, or an equilibrium catalysts (E-cat).

10 Claims, No Drawings

FISCHER-TROPSCH PROCESS USING A FISCHER-TROPSCH CATALYST AND A ZEOLITE-CONTAINING CATALYST

The present invention relates to a Fischer-Tropsch process for the conversion of carbon monoxide and hydrogen to $C_5^+$ hydrocabon mixtures using a Fischer-Tropsch catalyst and a zeolite-containing catalyst.

The Fischer-Tropsch process generally comprises the following process steps.

The first step involves reacting a source of carbon (such as coal or natural gas) with a source of oxygen (such as steam, air or oxygen) to form a mixture of carbon monoxide and hydrogen, usually referred to as synthesis gas.

The second step involves contacting the carbon monoxide and hydrogen with a Fischer-Tropsch catalyst leading to hydrocarbons and water. Depending on the process conditions and the catalyst used, the nature of the hydrocarbons and the chain length may vary. The main products of the Fischer-Tropsch reaction are linear olefins and paraffins and water, but limited isomerisation and inclusion of heteroatoms such as oxygen may occur. Generally applied catalysts for this second step are iron and/or cobalt-containing catalysts. In order to enhance isomerisation during this second step, a co-catalyst can be added.

The third step involves isomerisation of the hydrocarbons formed in the second step to produce more valuable products. For instance, the longer chains in the product may be cracked to form products in the diesel or gasoline range, and linear paraffins may be isomerized to improve diesel product properties like cloud point and pour point. Generally, adapted hydrotreating catalysts are used for this third step.

U.S. Pat. No. 5,928,980 discloses the use—in the second step of the Fischer-Tropsch process—of a spent fluid catalytic cracking (FCC) catalyst impregnated with a group VIII metal, preferably cobalt and/or iron. This catalyst composition is prepared by impregnating the spent FCC catalyst with a metal salt, calcining the impregnated FCC catalyst to obtain a supported metal oxide, and reducing the metal oxide to the metal in a reducing gas atmosphere. The impregnated metal serves as the Fischer-Tropsch catalyst.

The preparation of this prior art catalyst composition requires a cumbersome process—involving the steps of impregnation, calcination, and reduction. It is therefore an object of the present invention to provide a process for the conversion of carbon monoxide and hydrogen to $C_5^+$ hydrocabon mixtures using a system of a Fischer-Tropsch catalyst and an FCC catalyst, which system is easier to prepare.

A second object is to provide a process using a catalyst system which can be used more flexibly according to need.

A third object is to provide an inexpensive catalyst system.

The prior art only discloses the use of spent FCC catalyst in a Fischer-Tropsch process. It is a fourth object of the present invention to enlarge the scope of FCC catalyst to be used in Fischer-Tropsch processes by using also other types of FCC catalysts.

The process according to the invention uses Fischer-Tropsch catalyst particles and fluid catalytic cracking catalyst particles.

Hence, the catalyst composition according to the present invention can be prepared by simply mixing existing Fischer Tropsch catalyst particles and FCC catalyst particles. Its preparation does not require industrially undesired impregnation steps.

In one embodiment, the Fischer-Tropsch catalyst particles and the FCC catalyst particles may be used in the form of shaped bodies in which both particles are embedded. Examples of shaped bodies are spray-dried particles (microspheres), extrudates, pellets, spheres, etc.

Such shaped bodies can be prepared by shaping a physical mixture of Fischer-Tropsch catalyst particles and FCC catalyst particles. Suitable methods to obtain such shaped bodies include spray-drying, pelletising, extrusion (optionally combined with kneading), beading, or any other conventional shaping method used in the catalyst and absorbent fields or combinations thereof.

For instance, if the preparation of the Fischer-Tropsch catalyst particles involves a spray-drying step, it is possible to add the FCC catalyst to the Fischer-Tropsch catalyst before spray-drying and subsequently spray-dry the resulting mixture.

If desired, a matrix or binding material can be added to improve the mechanical strength of the shaped bodies. Examples of suitable matrix or binding materials are alumina, silica, clays, and mixtures thereof. Matrix or binding materials comprising alumina are generally preferred. The matrix or binding material, if present, is preferably present in an amount of 10–40 wt %, more preferably 15–35 wt %, and most preferably 25–35 wt %, based on the total weight of the catalyst composition.

The term 'FCC catalyst' includes fresh FCC catalysts, spent FCC catalysts and equilibrium catalysts (E-cat). A spent FCC catalyst is less expensive than a fresh FCC catalyst. Furthermore, its use results in re-use of waste materials, which is economically and environmentally favourable.

If the FCC catalyst particles and the Fischer-Tropsch catalyst particles are not in the form of shaped bodies in which both particles are embedded, the Fischer-Tropsch catalyst particles and the FCC catalyst particles can be dosed individually—according to need—to the Fischer-Tropsch unit. This creates great flexibility. For instance, if the process conditions change during processing or if one of the catalysts deactivates faster than the other, one of the catalysts might be added with a faster dosing rate than the other.

Furthermore, the quality of E-cat or spent FCC catalyst will vary from batch to batch. This difference can be compensated for by adapting the dosing rate of the FCC catalyst particles compared to that of the Fischer-Tropsch catalyst particles.

In addition, it is possible to either use both types of catalyst particles in the second step of the Fischer-Tropsch process, or to use the Fischer-Tropsch catalyst particles in the second step and the FCC catalyst particles in the third step.

The term 'FCC catalyst' refers to any catalyst composition that can suitably be used in FCC processes. Any conventional FCC catalyst can be used in the process according to the invention, although zeolite Y-containing FCC catalysts are preferred. Such FCC catalysts generally contain zeolite Y, clay (e.g. kaolin, metakaolin, bentonite), silica, alumina, rare-earth metal compounds, etc.

Examples of suitable metals are rare earth metals, e.g. Ce, La, and transition metals of Groups IV–VIII of the Periodic System, e.g. V, Cr, Mn, Fe, Co, Ni, Cu, Zr, Nb, Ru, Re, etc. The metal compounds can serve to, e.g., increase the particle strength (e.g. La compounds), enhance the catalyst's stability (e.g. Ni compounds), or enhance CO conversion (e.g. Fe, Co, or Ru compounds).

This metal compound is preferably present in or on the FCC catalyst particles in amounts of 0.1 to 10 wt %, more preferably 0.3 to 2 wt %, calculated as oxide, and based on the total weight of metal-containing FCC catalyst.

The metal compound can be deposited on the FCC catalyst particles in any manner known in the art. Examples of such methods are impregnation, ion-exchange, and deposition precipitation of soluble metal salts.

If desired, the metal-deposited FCC catalyst particles is calcined and/or pre-reduced after the metal compound has been deposited.

An additional advantage of using a spent FCC catalyst compared to a fresh FCC catalyst is that a spent FCC catalyst will generally contain a desired metal compound, due to the fact that the hydrocarbon feed to be cracked in an FCC unit generally contains various metals—e.g. nickel, vanadium. Consequently, no additional deposition step is required to introduce such a metal compound.

The Fischer-Tropsch catalyst can be any conventional Fischer-Tropsch catalyst, preferably comprising iron and/or cobalt. For the preparation of such catalysts it is referred to, e.g., WO 01/97968, WO 01/89686/ and WO 01/70394.

The Fischer-Tropsch catalyst can be promoted with various metals, e.g. Al, Ti, Cr, Mn, Ca, Na and/or K. Furthermore, the Fischer-Tropsch catalyst particles can contain binder materials, such as silica and/or alumina.

Both the FCC catalyst particles and the Fischer-Tropsch catalyst particles can be used in the second step of the Fischer-Tropsch process, either in the form of separate particles, or in the form of shaped bodies in which both particles are embedded. Based on the total weight of FCC catalyst particles and Fischer-Tropsch catalyst particles, the FCC catalyst particles are preferably be used in an amount of 5 to 40 wt %, more preferably from 10 to 30 wt %.

The second step can be carried out in any suitable reactor, such as a (fixed) fluidised bed reactor. The temperature ranges preferably from 250° to 400° C., more preferably from 300° to 370° C., and most preferably from 330° to 350° C. The pressure preferably ranges from 10 to 60 bar, more preferably 15 to 30 bar, and most preferably about 20 bar.

The $H_2/CO$ volume ratio preferably ranges from 0.2 to 6.0, preferably 0.5–6, most preferably 1–3.

The third step is generally conducted at temperatures of 150 to 600° C., more preferably 200 to 500° C., and most preferably 300 to 400° C. The pressure preferably ranges from 5 to 60 bar, more preferably from 15 to 40 bar, and most preferably from 20 to 30 bar.

The resulting hydrocarbon product preferably contains, on a mass basis, at least 35%, more preferably at least 45%, and most preferably at least 50% of $C_5^+$ compounds. The process may be used for the production of branched hydrocarbons, olefins, and/or aromatics. Preferably, the process is used for the production of liquid fuel, especially diesel and gasoline, and preferably unleaded gasoline.

EXAMPLE

The following experiments illustrate the suitability of zeolite-Y-based FCC catalysts (fresh and E-cat), for the isomerisation of linear olefinic products under typical Fischer-Tropsch process conditions.

Catalysts which are suitable for this purpose can be used either in the second step (as co-catalyst) or in the third step of the Fischer-Tropsch process in order to enhance the isomerisation of the linear olefinic products.

To this end, the performance of the FCC catalysts was tested in a hydroisomerization of 1-hexene. The reaction conditions (temperature, total pressure and dihydrogen pressure) for the performance tests were identical to the conditions present in a typical high temperature Fischer-Tropsch process:

Temperature: 340° C.
Total Pressure: 20 bar
Catalyst intake: 2.2 g
WHSV, 1-Hexene: 2.85 g/g/hr (based on zeolite present)
$H_2$ Partial pressure: 9 bar
$N_2$ Partial pressure: 10.8 bar
1-Hexene Partial pressure: 0.22 bar
Mole ratio $H_2$/1-Hexene: 40.9
Mole ratio $N_2$/1-Hexene: 49.1

The FCC catalysts were reduced in situ in the reactor under 20 bar hydrogen pressure 340° C. for 1 hr. After the reduction procedure was completed, the nitrogen flow was introduced and subsequently 1-hexene was dosed (0.11 ml/min). The composition of the reaction product was followed by on-line GC analysis.

Three different types of FCC catalysts were tested according to this procedure: a fresh FCC catalyst containing a low amount of rare earth (RE), a fresh FCC catalyst containing a high amount of rare earth metals, and an equilibrium FCC catalyst (E-cat) resulting from the FCC catalyst with a low amount of RE.

The product distribution obtained in these tests at 0.5 hr and at 17.5 hr runtime are presented in Tables 1 and 2, respectively.

In these Tables, n–$C_6$ refers to normal $C_6$ paraffins, i–$C_6$ refers to branched $C_6$ paraffins, n–$C_6$= refers to normal $C_6$ olefins, i–$C_6$= refers to branched $C_6$ olefins, and <$C_6$ and >$C_6$ refers to compounds with less and more than 6 carbon atoms, respectively.

TABLE 1 test results at 0.5 hr. runtime

|  | Fresh FCC low RE | Fresh FCC high RE | E-cat |
|---|---|---|---|
| Conversion 1-hexene, wt % | 93.8 | 99.4 | 94.0 |
| n-$C_6$, wt % | 19.8 | 28.5 | 29.6 |
| i-$C_6$, wt % | 19.2 | 41.6 | 13.7 |
| n-$C_6$=, wt % | 9.4 | 0.7 | 24.3 |
| i-$C_6$=, wt % | 32.8 | 3.2 | 24.5 |
| <$C_6$, wt % | 10.9 | 20.2 | 4.4 |
| >$C_6$, wt % | 8.2 | 6.0 | 3.7 |
| i-$C_6$ + i-$C_6$=, wt % | 52.0 | 44.8 | 38.2 |

TABLE 2 test results at 17.5 hr. runtime

|  | Fresh FCC low RE | Fresh FCC high RE | E-cat |
|---|---|---|---|
| Conversion 1-hexene, wt % | 90.8 | 91.4 | 91.8 |
| n-$C_6$, wt % | 10.0 | 11.0 | 15.5 |
| i-$C_6$, wt % | 12.8 | 14.9 | 9.3 |
| n-$C_6$=, wt % | 20.2 | 15.1 | 39.3 |
| i-$C_6$=, wt % | 47.3 | 45.6 | 30.6 |
| <$C_6$, wt % | 3.4 | 5.3 | 3.0 |
| >$C_6$, wt % | 6.5 | 8.4 | 2.7 |
| i-$C_6$ + i-$C_6$=, wt % | 60.1 | 60.5 | 39.9 |

As can be seen from these tables, the fresh FCC catalyst with a low amount of RE has a high selectivity to branched $C_6$ olefins (i–$C_6$=) and branched $C_6$ paraffins (i–$C_6$). The total amounts of isomerized products at 0.5 hr and 17.5 hr runtime were 52.0 wt % and 60.1 wt %, respectively. This high isomerization selectivity was accompanied with a low level of cracking; only 3.4 wt % of products smaller than $C_6$ ($<C_6$) were obtained at 17.5 hr runtime. The amount of aromatic products was far below 1 wt % during the whole run.

The fresh FCC catalyst with a high amount of RE also showed a high selectivity to branched $C_6$ olefins (i–$C_6$=) and branched $C_6$ paraffins (i–$C_6$). The total amounts of isomerized products at 0.5 hr and 17.5 hr runtime were 44.8 wt % and 60.5 wt %, respectively. The level of cracking was 5.3 wt % at 17.5 hr runtime. The amount of aromatic products was far below 1 wt % during the whole run.

The equilibrium FCC catalyst showed a somewhat lower selectivity to branched C6 olefins (i–C6=) and branched C6 paraffins (i–C6) than the fresh FCC catalysts. The total amounts of isomerized products at 0.5 hr and 17.5 hr runtime were 38.2 wt % and 39.8 wt %, respectively. The level of cracking was only 3.0 wt % at 17.5 hr runtime. Again, the amount of aromatic products was far below 1 wt % during the whole run.

Although the level of isomerization of this E-cat was lower than that of the fresh FCC catalysts, it is still acceptable for use in the Fischer-Tropsch product, especially as co-catalyst in the second step.

These experiments show that FCC catalysts are able to isomerise linear olefinic hydrocarbons under typical Fischer-Tropsch conditions. This indicates their suitability for use in the second and third step of the Fischer-Tropsch process.

The invention claimed is:

1. A Fischer-Tropsch process for the conversion of carbon monoxide and hydrogen to $C_5$+ hydrocarbon mixtures comprising contacting carbon and hydrogen with a catalyst comprising distinct Fischer-Tropsch catalyst particles and fluid catalytic cracking catalyst particles.

2. The process of claim 1 wherein a reaction mixture of carbon monoxide and hydrogen is contacted with the Fisher-Tropsch catalyst particles and fluid catalytic cracking catalyst particles.

3. The process of claim 2 wherein the Fischer-Tropsch catalyst particles and the fluid catalytic cracking catalyst particles are dosed individually to the reaction mixture.

4. The process of claim 3 wherein the Fischer-Tropsch catalyst particles and the fluid catalytic cracking catalyst particles are dosed at different rate.

5. The process of claim 2, wherein the Fischer-Tropsch catalyst particles and fluid catalytic cracking catalyst particles are used in the form of shaped bodies in which both particles are embedded.

6. The process of claim 1 wherein the carbon and hydrogen or first contacted with the Fischer-Tropsch catalyst particles then are subsequently contacted with the fluid catalytic cracking catalyst particles.

7. The process of claim 1 wherein the Fischer-Tropsch catalyst particles comprise iron.

8. The process of claim 1 wherein the Fischer-Tropsch catalyst particles comprise cobalt.

9. The process of claim 1 wherein the fluid catalytic cracking catalyst is a spent or equilibrium fluid catalytic cracking catalyst.

10. The process of claim 1 wherein a metal compound has been deposited on the fluid catalytic cracking catalyst.

* * * * *